United States Patent [19]
Woodward

[11] Patent Number: 5,852,557
[45] Date of Patent: Dec. 22, 1998

[54] SWITCHING CONVERTER UTILIZING DUAL SWITCH OUTPUTS

[75] Inventor: Mark Woodward, Huntington Beach, Calif.

[73] Assignee: Pacific Power Source a Division of Thermo-Voltek, Huntington Beach, Calif.

[21] Appl. No.: 577,613

[22] Filed: Dec. 22, 1995

[51] Int. Cl.$^6$ .......................... H02M 7/00; H02M 3/335; H02M 1/12; G05F 3/16

[52] U.S. Cl. .......................... 363/124; 363/71; 363/134; 363/41; 323/222; 323/282

[58] Field of Search .................... 303/22–23, 41, 303/25–28, 71, 97–124, 134; 323/282–284, 222

[56] References Cited

U.S. PATENT DOCUMENTS

5,600,547  2/1997  Kim ........................................... 363/22

*Primary Examiner*—Edward Tso
*Assistant Examiner*—Rajnikant B. Patel
*Attorney, Agent, or Firm*—John P. Sumner, Esq.

[57] ABSTRACT

The present invention is a DC to AC switching converter that does not require a dead zone. The output node of the classical switching pair is separated into two output nodes which eliminates the current path that made the dead zone necessary. Each of the switches are connected between +Edc and −Edc in a complimentary fashion. By eliminating the direct connection between the two switches, both switches can be operating simultaneously without any danger of failure. Both switch outputs pass through a current sensing feedback device and an output coil. The outputs of each coil are connected to the output of the switching converter having a filter capacitor connected to ground. This arrangement provides switching bias current during the zero current crossover point thereby eliminating the ringing and oscillation distortion that occurs in the dead zone. The desired output voltage waveform is a result of the summation of the two switch outputs after the high speed component has been removed through filtering. The output filtering demands of the present invention are greatly reduced and the switching frequency ($f_c$) is effectively $2f_c$ which improves the response time to a desirable 50 usec or less.

4 Claims, 6 Drawing Sheets

SWITCHING CONVERTER UTILIZING DUAL SWITCH OUTPUTS

FIELD OF THE INVENTION

The present invention relates to switching power supplies used to deliver a wide variety of power waveforms. The amplifier in the switching power supply converts DC to an AC signal using high frequency switches with high efficiency and broad band-width.

BACKGROUND OF THE INVENTION

DC to AC power converters or power supplies are generally of two types. Linear converters typically have a very fast response time or a broad band width so that the output signal fidelity is maintained for a variety of load conditions. However linear converters are inefficient in that a considerable amount of power is wasted in the form of heat generated during the conversion process. The heat that must be removed from the converter and is one of the factors that limits the maximum power output for a liner converter.

A second type of converter is a switching converter or switching power supply to which the present invention is related. Switching converters are very efficient however their response time, or their ability to respond to changing load demands, is usually much lower than desired. In a typical switching converter, two switches are connected together to provide the desired AC output through a filter. It is imperative that one of the switches must be completely turned off before the other switch is turned on. If both switches are conducting at the same time then the converter is rapidly destroyed. Consequently, there must be a "dead zone" which is the period of time when neither of the switches in a switching pair are biased to the "on" state. During this period the current output crosses over the "zero" point and neither of the switches are biased on. During the dead zone period, especially under a light load, inductor current goes to zero leaving both switching devices without a solid bias. This causes unpredictable crossover currents that lead to instability such as oscillation and ringing can occur that can cause distortion of the desired output waveform. The dead zone requirement also limits the frequency ($f_c$) at which the converter can operate.

Presently available solid state switching devices have rise and fall times that limit the maximum practical switching frequency. The switching rate of a reliable switching device is typically less than 100 Khz and for most other devices the limit is in the 50–60 Khz range. This is because these solid state switching devices have relatively moderate rise times and even longer fall times, on the order of 200 nsec and more. Since one of the switchers has to be turned on only after the other is totally off, the relatively long rise and fall times dictate a relative large dead zone for reliable operation. If the switching frequency is increased, then the dead zone period occupies a higher percentage of the duty cycle causing a decrease in stability. These switchers cannot be switched at anywhere near the optimal desired switching rates such as several hundred Khz. Thus, their switching rate is limited to about 60 Khz or less. Even if switchers with much shorter rise and fall times were available for possible use in switching converters, the drop in efficiency that may occur due to the significantly higher switch rates must be considered. As is known, the loss of power in a switching converter is directly proportional to its switching rate. Consequently, the higher the switching rate, the greater the power loss and the lower the efficiency.

Switching converters also require 80 db or more of filtering to block the high frequency switching energy from being passed to the load. This filtering requirement results in relatively narrow bandwidth and long response times in the order of 500 usec or more in an environment in which a 50 usec response time is often desired.

U.S. Pat. No. 4,843,534 uses multiple sets of phase delayed switch sets to solve the problem of long response time. This solution to the problem is at the expense of more complicated and expensive circuitry that still uses switch pairs that are connected together and that have the "dead zone" requirements. While the response time problem is solved, the "dead zone" requirements allow instability from crossover currents using the high speed path inherent in the classical connection of the two switches. The dead zone requirements also result in the loss of useful range and limited switch rates.

Distortions caused by the dead zone can lower the performance specifications of the switching converter to the point where the converter can not be uses for applications in which a power supply is used to test a piece of electrical equipment for susceptibility to power distribution animalities that can occur in American or European power distribution grids. Typically linear converters are used for this purpose because of their higher performance outputs. However the linear converters usually have an efficiency of only 50 to 60% whereas a switching converter will have an efficiency of approximately 95% that greatly reduces the cost of operation of the converter as well as the cost of the converter itself.

Therefor it would be of great advantage the have a switching converter that eliminated the requirement of a dead zone and the attendant instabilities associated with the dead zone. Such a converter would be less expensive to manufacture and operate and would still meet the performance requirements for a DC to AC power converter used to test electrical equipment for susceptibility to power distribution irregularities.

SUMMERY OF THE INVENTION

The present invention is a DC to AC switching converter that has no requirement for a dead zone. The output node of the switching pair is separated into two output nodes thereby eliminating the current path that made the dead zone necessary. Each half of the switch is connected between +Edc and −Edc in a complimentary fashion. By eliminating the direct connection between the two switches, both switches can be operating at the same time without any danger of failure. The outputs of both switches pass through a current sensing feedback device and an output coil. The outputs of each coil are connected to the output of the switching converter that has a filter capacitor connected to ground. By using this arrangement, switching bias current is maintained during the zero current crossover point thereby eliminating the ringing and oscillation distortion that can and do occur when both switches are biased off and the output current crosses the zero point. The desired output voltage waveform is a result of the summation of the two switch outputs after the high speed component has been removed through filtering. The filtering demands of the present invention are greatly reduced and the effective switching frequency ($f_c$) is $2f_c$. Therefore, if $f_c$=80 Khz then the effective switching frequency is 160 Khz which improves the response time to 50 usec or less.

The object of the present invention to provide a switching converter wherein both switches can be operated simultaneously thereby eliminating the dead zone requirement.

It is another object of the invention to provide a switching converter having reduced circuit complexity while maintaining desired response time specifications.

It is a further object of the invention to provide a switching converter that eliminates the oscillation and ringing distortion associated with the zero current crossover point occurring in the dead zone.

The novel features of the present invention are set forth with particularity in the appended claims. The invention will best be understood from the following description when read in conjunction with the accompanying drawings in which:

DETAILED DESCRIPTION OF THE PREFERRED EMBODIMENT

Figure 1:
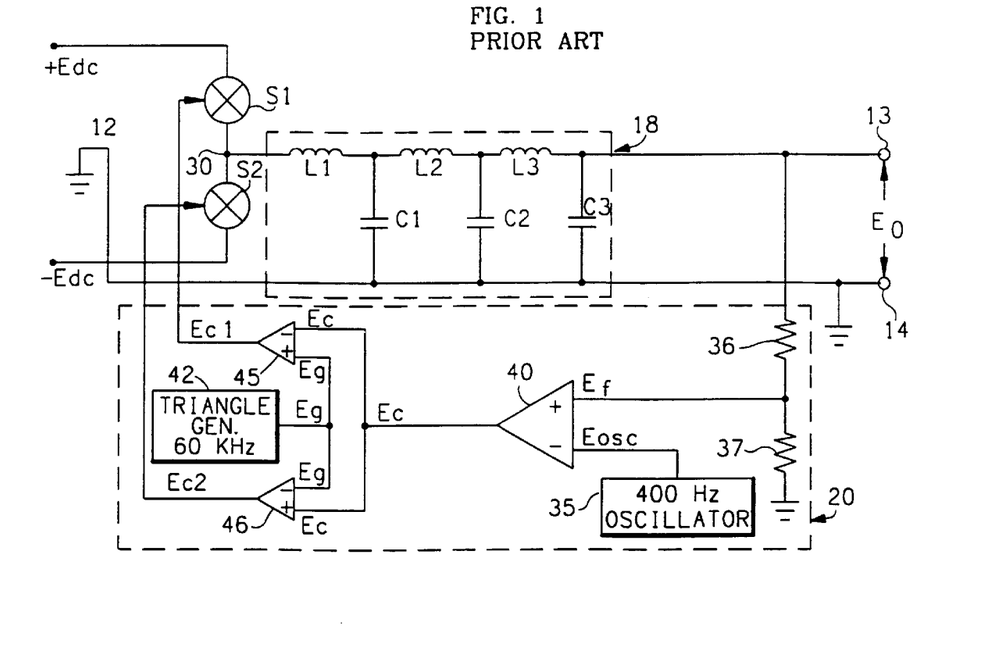
FIG. 1 is a drawing that corresponds to FIG. 3 in U.S. Pat. No. 4,067,057 and is used to summarize the prior art.
Figure 2:
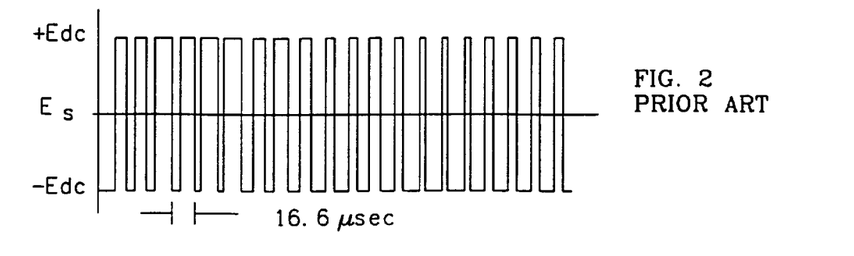
FIGS. 2 and 3 are waveform diagrams corresponding to FIGS. 2 and 3 in U.S. Pat. No. 4,843,534 and are useful in explaining the operation of the switch shown in FIG. 1.
Figure 3:
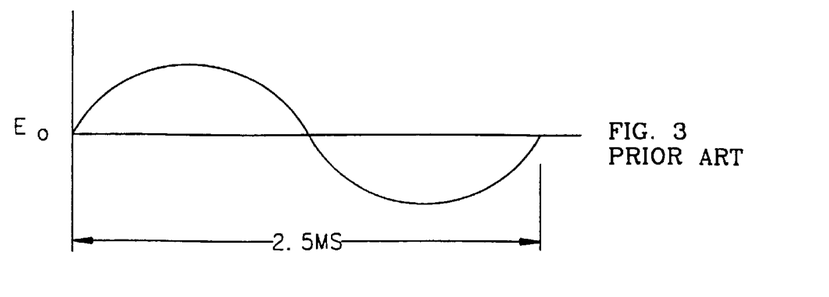

The present invention is a switching converter that has eliminated the necessity of having a dead zone by removing the direct current path between the two switching devices. To understand the problem, reference is made to FIGS. 1 through 4 which represent a prior art switching converter, its associated output and the dead zone requirements. FIGS. 1 to 3 effectively correspond to FIGS. 3, 2b and 2c in U.S. Pat. No. 4,067,057 issued on Jan. 3, 1978 and incorporated herein by this reference. In this switching converter, a single set of two switches, S1 and S2, is connected across a DC source comprising +Edc and −Edc. The switching rate or frequency $F_c$ is controlled by the triangle wave generator 42. The '057 patent shows a 10 Khz generator that was used at the time due to switching device limitations. The percent of modulation is a function of the error signal Ec which in turn is a function of the relationship of the waveform from oscillator 35, designated Eosc, and the output waveform Eo across output terminals 13 and 14. The output frequency of oscillator 35 is shown herein as 400 Hz (150 Hz in the '057 patent) which corresponds to the desired output frequency.

FIG. 2 shows the 60 Khz switching frequency voltage at junction node 30 and FIG. 3 is the desired 400 Hz waveform after filtering by the multiple L–C sections of filter 18. The limited advantages of such a switching converter are well known and include large filter requirements. For instance, assuming that +Edc=+200 V and −Edc=−200 V, a swing of 400 volts, and that not more than 400 mV ripple voltage is acceptable, the filter would have to provide 60 db of filtering. At a switch rate of 60 Khz one can obtain such filtering with inductance of 208 Uh and a capacitor of 33 uF. The corner of the filter would be at only 600 Hz giving a very narrow band width. Higher switching rates would improve the band width but would come at the price of increased cost and reduced efficiency.

Figure 4:
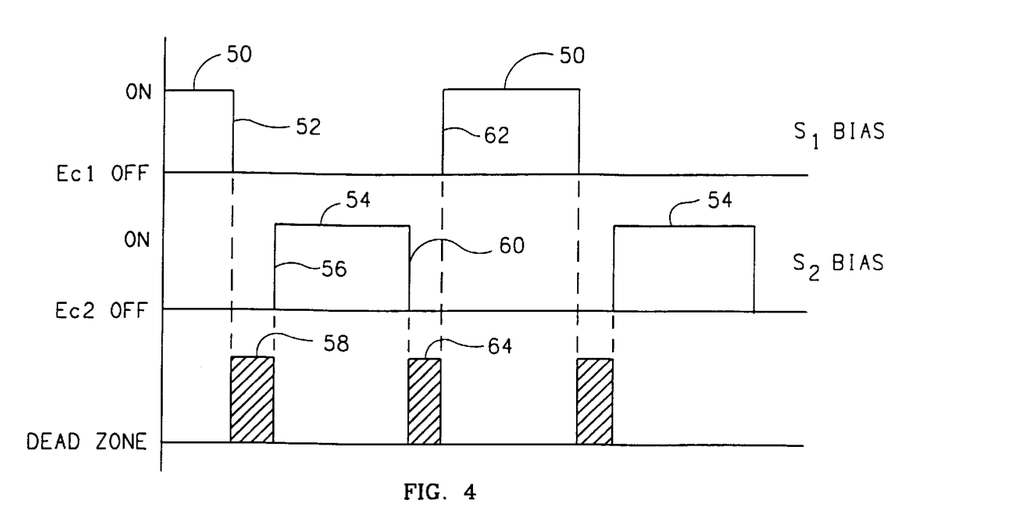
FIG. 4 is a waveform diagram useful in showing the dead zone requirement.

From a ripple current point of view, assuming a 40 A output current and a 20% ratio of ripple current to output current, the ripple current would fluctuate with a peak to peak swing of 16 A. This peak to peak ripple current will occur at 50% modulation and will decrease with increased modulation. However, at best it still will be on the order of 10 A or more. Thus, large capacitors are needed to compensate for the large ripple current. Other disadvantages of the circuit shown in FIG. 1 include the distortions caused when both S1 and S2 are biased off and the output current passes through the zero current crossover point. The time period when both S1 and S2 are biased off is called the dead zone and is shown in more detail in FIG. 4. Waveform 50 in FIG. 4 represents the bias signal Ec1 for S1 shown in FIG. 1 and waveform 54 represents the bias signal Ec2 for S2. The trailing edge 52 of waveform 50 is the time when S1 is biased off and the leading edge 56 of waveform 54 is the time when S2 is biased on. The dead zone 58 therefore represents the time period when both S1 and S2 are biased off. A similar dead zone 64 is required between trailing 60 and leading edge 62. Depending on the device or devices used as S1 and S2, the dead zone can range from approximately 300 nsec to 4 usec. The dead zone must be sufficiently large to account for the temperature increases of S1 and S2 that occur during normal operation of the converter. The increased temperature caused the dead zone to shrink, which if severe enough, will cause elimination of the dead zone and simultaneous conduction of the switches S1 and S2. This in turn causes destruction of the switches.

As discussed before, the necessary presents of the dead zone causes distortion in the form of ringing and oscillation during zero current crossover.

Figure 5:
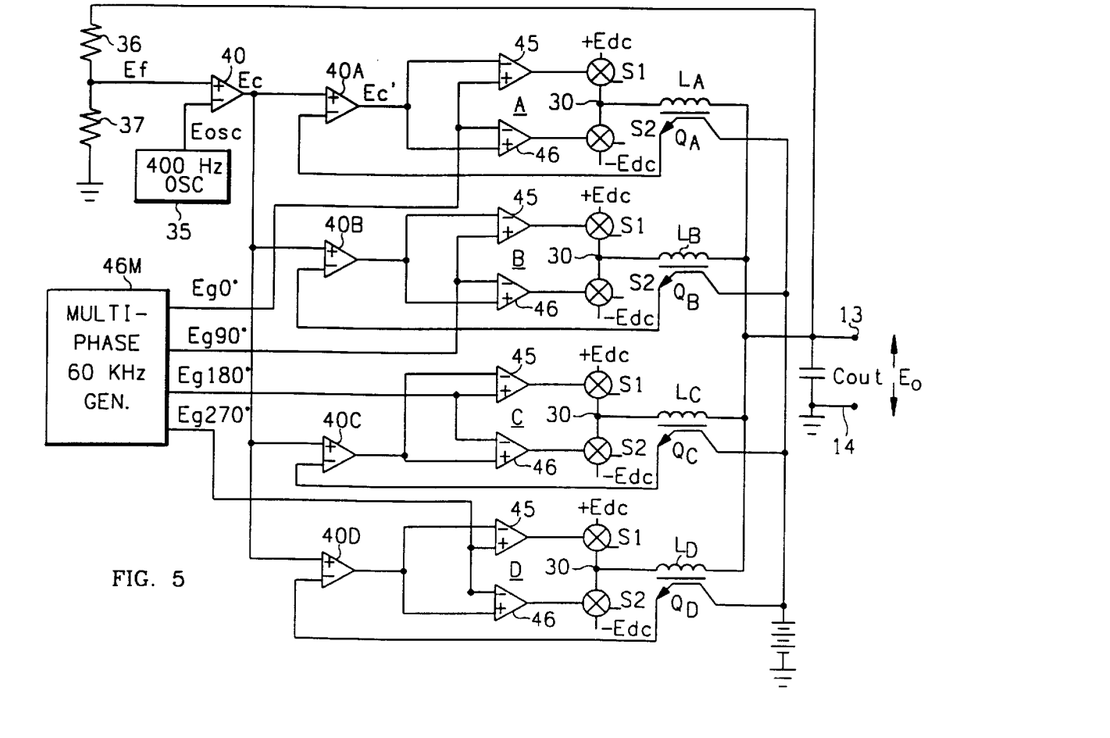
FIG. 5 is a circuit diagram corresponding to FIG. 7 in U.S. Pat. No. 4,843,534 and is useful in showing the prior art circuit complexity used to increase converter response time.

To solve the problem of slow response time, the prior art circuit shown in FIG. 5 was invented as disclosed in U.S. Pat. No. 4,843,534. FIG. 5 corresponds to FIG. 7 in the '534 patent. As disclosed in the '534 patent, the present FIG. 5 uses 4 sets of switching pairs, or 8 switches, to increase the response time by a factor of 10 and to decrease the filtering requirements. However these improvements come at the cost of greater circuit complexity and expense and decreased circuit efficiency. The operation of the circuit shown in FIG. 5 is explained in the '534 patent which is incorporated herein by this reference.

The present invention achieves approximately the same advantages of the circuit shown in FIG. 5 and at the same time eliminates the need for a dead zone thereby providing additional benefit in the form of reduced instabilities from reduced ringing and oscillation distortion during zero current crossover.

Figure 6:
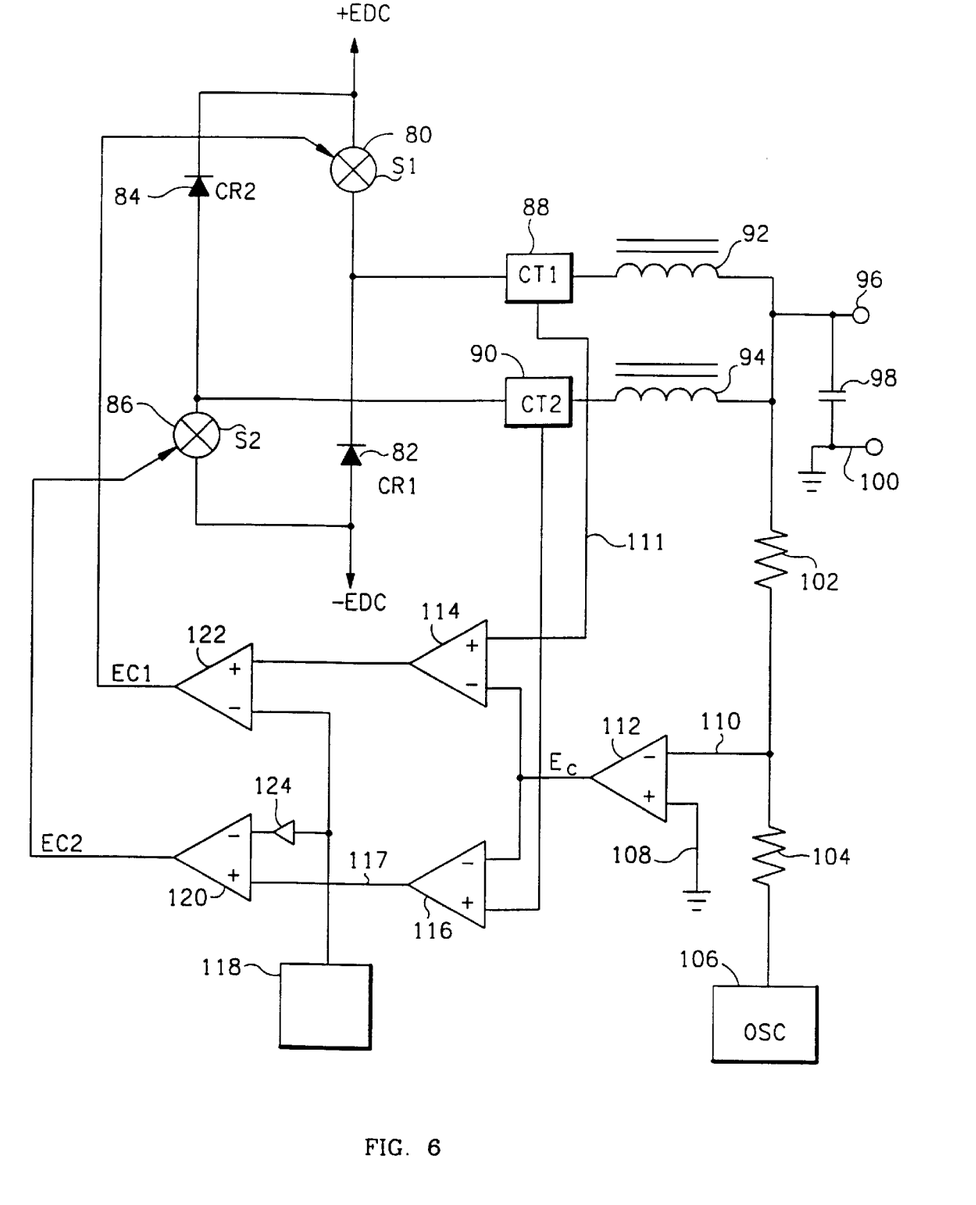
FIG. 6 is a block diagram of the present invention.

FIG. 6 is a block diagram of the present invention showing switches 80 and 86 each connected, in series with diodes 82 and 84 respectively, between +Edc and −Edc. With switches 80 (S1) and 86 (S2) no longer directly connected together, the switches can now operate simultaneously and take advantage of voltage cancellation to produce and output waveform that is controlled by the duty cycle or modulation of the switches 80 and 86. During zero current crossover, both switches are actively biased thereby greatly reducing the potential for distortion from ringing and oscillation. Another advantage of the present invention is a reduction in ripple current and an increase in response time.

Figure 7A:
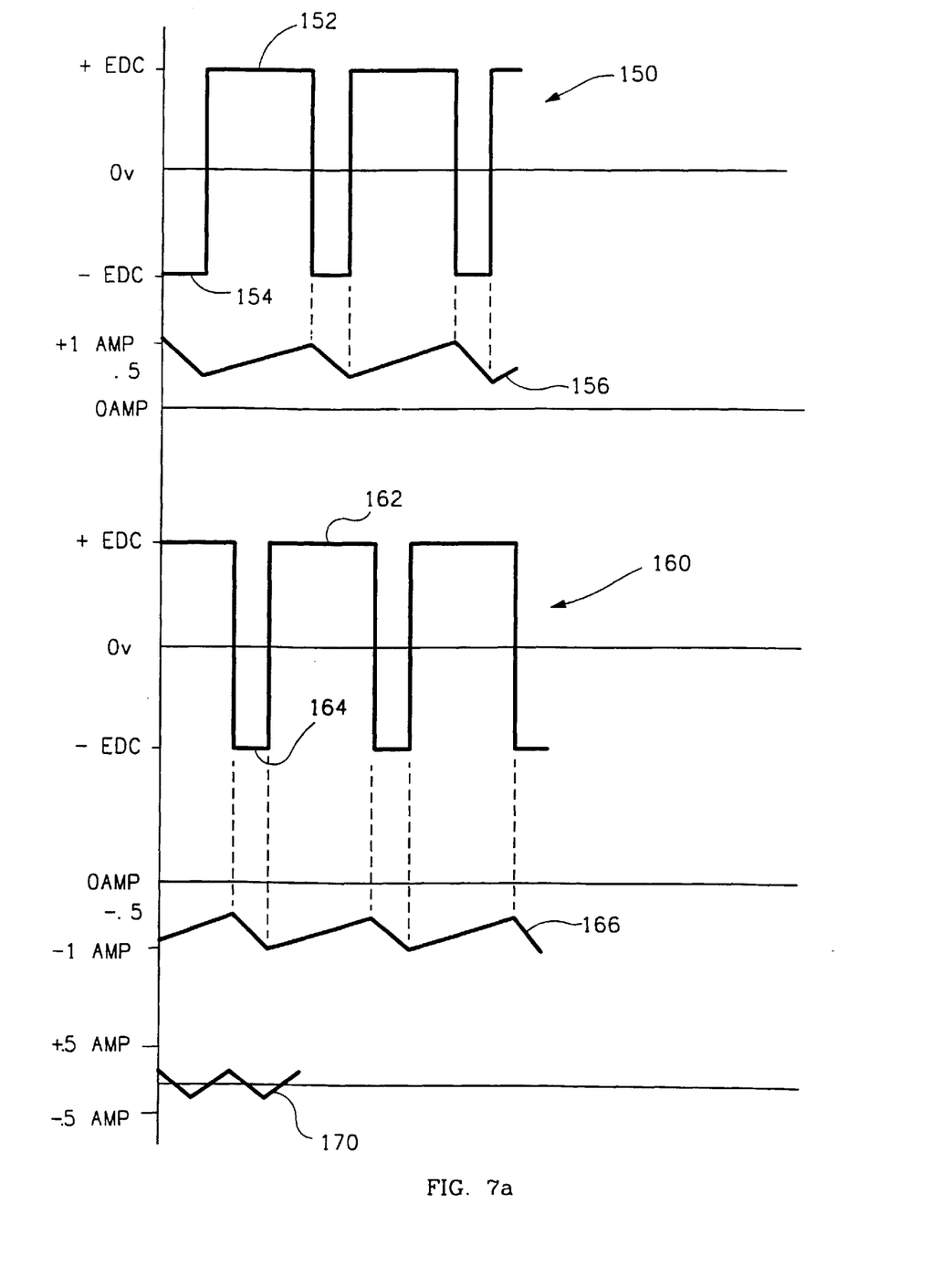
FIG. 7a is a waveform diagram showing the output voltage and output current of the switches $S_1$ and $S_2$ and FIG. 7b shows the voltage output of the present invention.
Figure 7B:
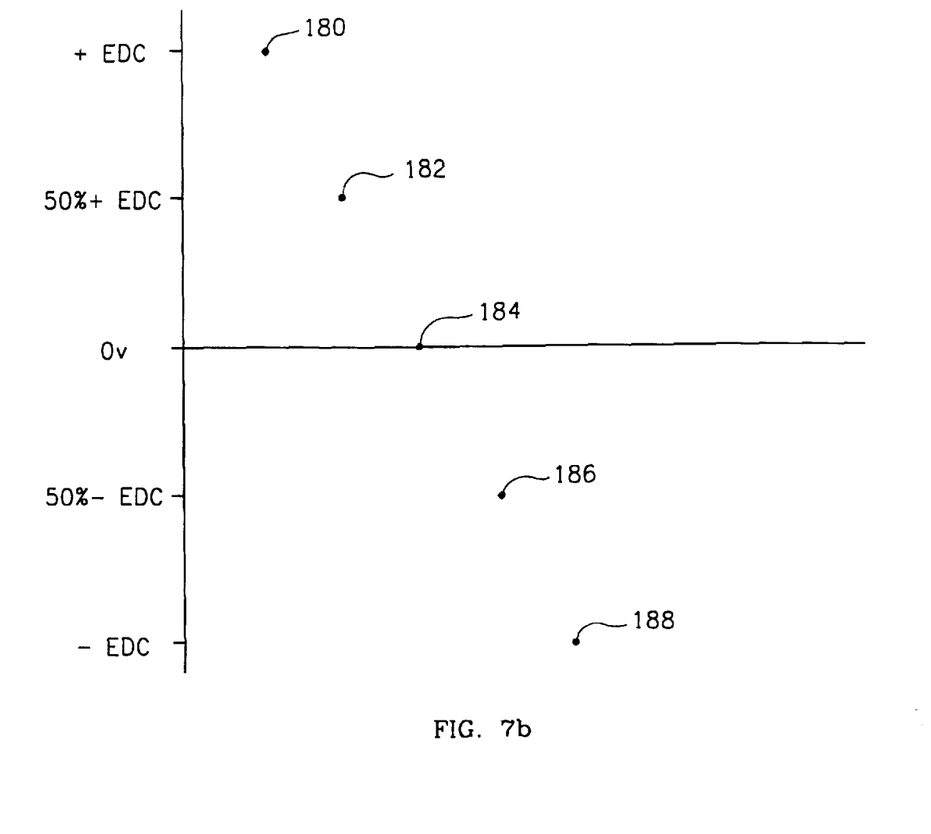

With reference to the operation of the circuit shown in FIG. 6, the output of switch 80 is connected to a current sensing device 88, such as a hall effect device, to provide negative current feedback that is set to keep switch 80 constantly biased in the on state. Similarly, the output of switch 86 is connected to the current sensing device 90 to provide negative current feedback that is set to keep switch 86 constantly biased in the on state. The outputs of the switches 80 and 86 are connected respectively through coils 92 and 94 to the signal output terminal 96. A filter capacitor 98 is connected across the signal output terminals 96 and 100. Negative feedback is provided through resistor 102 and the desired output waveform is provided by oscillator 106 through resistor 104. The negative voltage feedback signal and the oscillator signal are combined at line 110 and fed into the negative input of amplifier 112. The positive input of amplifier 112 is tied to ground via line 108. The output of amplifier 112 is connected to the negative inputs of amplifiers 114 and 116 and the outputs of the current sensors 88 and 90 are respectively connected to the positive inputs of the amplifiers 114 and 116. This connection integrates the combined oscillator and negative voltage feedback signal from line 110 with the separated current feedback signals from each switch to produce current and voltage compensated drive signals on lines 115 and 117. These drive signals are combined with the switching frequency triangle wave, generated by triangle wave generator 118, in amplifiers 122 and 120 respectively. Amplifiers 122 and 120 provide the drive signals Ec1 and Ec2 to the switches 80 and 86. The operation of this invention will now be discussed with reference to FIG. 7.

FIG. 7a is a waveform diagram showing the output waveform of the switches 80 and 86. FIG. 7b shows an example of the voltage output for the converter at various modulation levels. References will now be made between FIG. 6 and FIGS. 7a and 7b. Waveform 150 is the output voltage waveform for switch 80 and waveform 156 is the output current waveform for switch 80. Waveform 150 has a 75% positive modulation level wherein the output spends 75% of the time at +E$_{DC}$ and 25% of the time at -E$_{DC}$. This modulation level produces a current output, shown by waveform 156, that varies between +0.5 A and +1.0 A. These output waveforms assume that there is no load component.

Waveform 160 shows the output voltage waveform for switch 86 and waveform 166 shows the output current waveform for switch 86. Waveform 160 has a 75% positive modulation level wherein the output spends 75% of the time at +E$_{DC}$ and 25% of the time at -E$_{DC}$. This modulation level produces a current output, shown by waveform 166, that varies between -0.5 A and -1.0 A. Waveform 166 is at a negative current level because switch 86 is connected directly to -E$_{DC}$, and is connected to +E$_{DC}$ through diode 84. When connected in this manner, switch 86 can only conduct a negative current. Likewise, switch 80 is connected so that it can only conduct a positive current. The voltage and current outputs of switches 80 and 86 are combined after passing through coils 92 and 94 to produce a output current represented by waveform 170 which is the summation of current waveforms 156 and 166.

The output voltage level at point 96 in FIG. 6 is 50% of +E$_{DC}$. FIG. 7b shows this voltage level as point 182. This output voltage level results from the summation of the voltage duty cycles as described above with respect to waveforms 150 and 160 which are 180° out of phase. The phase relationship between the outputs of switches 80 and 86 determines the level of output ripple current and the output voltage level is determined by the duty cycle. The switches are normally kept 180° out of phase to minimize the ripple current and the duty cycles of the switches are varied to produce the desired output voltage. If both switches 80 and 86 have an approximately 100% +E$_{DC}$ duty cycle then the output voltage will be at +E$_{DC}$. This is shown by voltage point 180 in FIG. 7b. Similarly, if both switches 80 and 86 have an approximately 100%-E$_{DC}$ duty cycle then the output voltage will be at -E$_{DC}$. This is shown by voltage point 188 in FIG. 7b. If both switches 80 and 86 have a 50% +E$_{DC}$ duty cycle then the output voltage will be at 0 volts as shown by voltage point 184. Voltage point 186 results from a duty cycle in which switches 80 and 86 have an approximately 75%-E$_{DC}$ duty cycle. Therefore, by varying the duty cycle of the two output switches 80 and 86, the output voltage can be varied to any level between +E$_{DC}$ and -E$_{DC}$. Both switches can operate at the same time because there is no direct connection between the switches. Thus, there is no requirement for a dead zone and the attendant instability and distortion problems that result from such a requirement.

Figure 8:
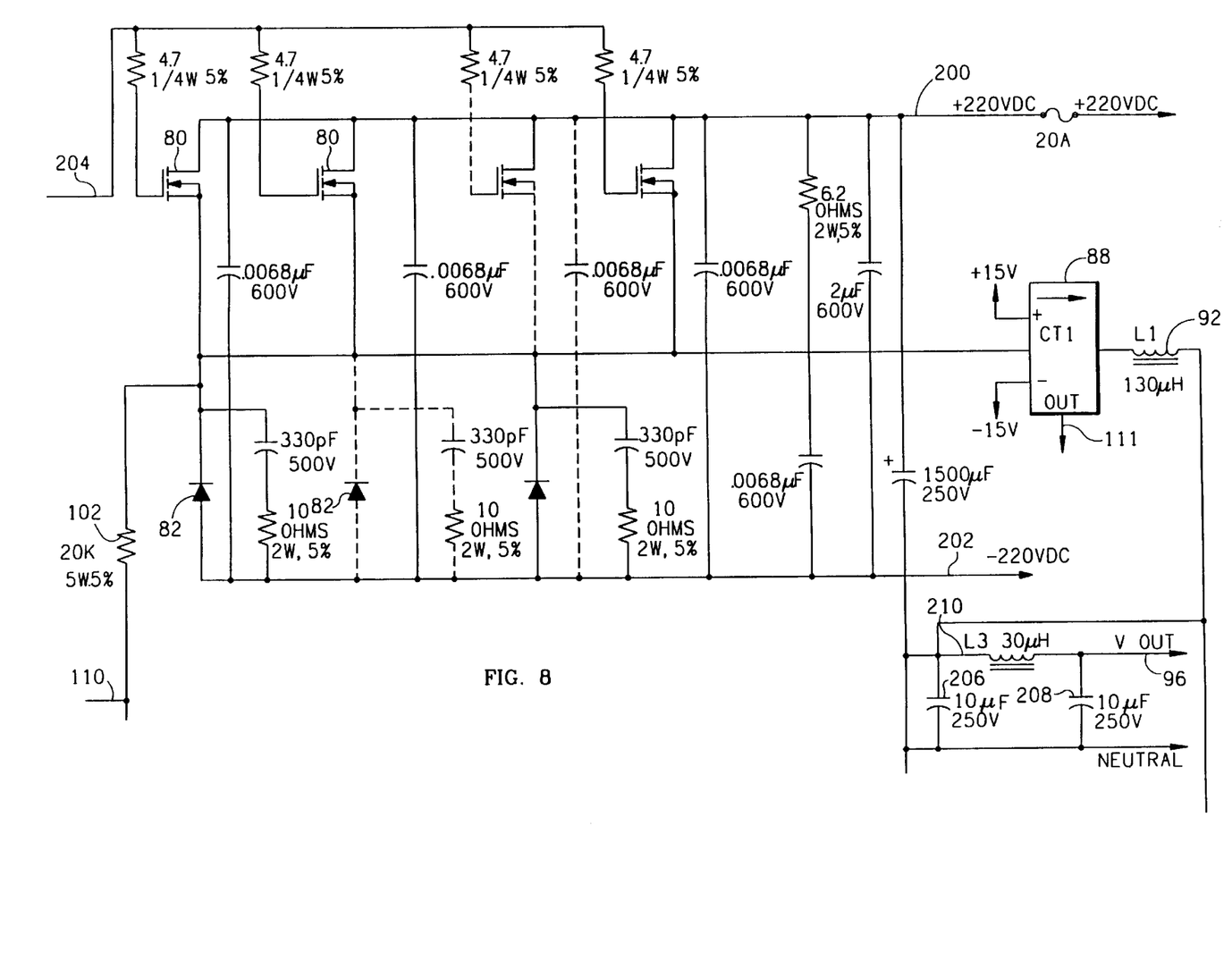
FIG. 8 is a detailed circuit diagram of switch $S_1$ connected to the output of the switching converter as shown in the block diagram of FIG. 6.

Turning now to FIG. 8, FIG. 8 is a detailed circuit diagram of switch S$_1$ connected to the output of the switching converter as shown in the block diagram of FIG. 6. Line 200 represents the +E$_{DC}$ input shown in FIG. 6 and line 202 represents the -E$_{DC}$ input. Line 204 in FIG. 8 is the same as the Ec1 output of amplifier 122 in FIG. 6. Resister 102 and line 110 are the same in both Figures. Current sensor 88, coil 92 and output 96 are also the same in both figures. Capacitors 206 and 208 and coil 210 are the output filter for removing the high frequency component from the output.

FIG. 8 shows the switch 80 connected in parallel to as many as 4 like devices. By connecting the switches in parallel, the output current capabilities of the power supply can be increased. Diode 82 is shown connected between -E$_{DC}$ and the switch 80 and is also connected in parallel as shown in FIG. 8. Switch 86, not shown, is connected the same as switch 80 except that switch 80 is connected directly to -E$_{DC}$ on one side and is connected to the anode of diode 84, FIG. 6, which in turn is connected to +E$_{DC}$. When connected in the fashion, switch 80 will only conduct a positive current and switch 86 will only conduct a negative current. By connecting the switches in this manner, both switches in the switching power supply can operate simultaneously without being destroyed. There is no requirement for a dead zone with the associated instabilities that occur when both switches are biased off at the zero current crossover point. The switch operates at an effective switching frequency of 2f$_c$ that increases the response time to 50 usec or less which is acceptable for testing a piece of electrical equipment for susceptibility to power distribution animalities that can occur in American or European power distribution grids.

While the switching converter of the present invention is shown with reference to FIGS. 1 through 8, the instant invention is not limited to the exact circuitry shown herein, for obvious modifications can be made by a person skilled in the art.

What is claimed is:

1. A switching power supply circuit connected in a manner eliminating the requirement for a dead zone comprising:

switching means having first and second switching devices connected between +E$_{DC}$ and -E$_{DC}$ wherein said first switching device is connected to +E$_{DC}$ and is connected to -E$_{DC}$ through a diode and wherein said second switching device is connected to -E$_{DC}$ and is connected to +E$_{DC}$ through a diode, the output nodes of said first and second switching devices each being connected to a filter which is connected to the supply output, drive means having first and second outputs connected respectively to said first and second switching devices for controlling said switching devices, and first current feedback means connected on the output side of one of said first or second switching devices and to said drive means, said first current feedback means providing current feedback for biasing at least one of said first or second switching devices in the conduction mode during zero current crossover.

2. The switching device of claim 1 including:

voltage feedback means connected between the output side of said supply and said drive to supply voltage feedback to said drive means for controlling the output of said switching power supply.

3. The switching device of claim 1 including:

second current feedback means connected on the output side of the other of said first or second switching device and to said drive means, said second current feedback means providing current feedback for biasing the other of said first or second switching devices in the conduction mode during zero current crossover.

4. A switching power supply circuit connected in a manner eliminating the requirement for a dead zone comprising:

switching means having first and second switching devices connected between +$E_{DC}$ and −$E_{DC}$ wherein said first switching device is connected to +$E_{DC}$ and is connected to −$E_{DC}$ through a diode and wherein said second switching device is connected to −$E_{DC}$ and is connected to +$E_{DC}$ through a diode, the output nodes of said first and second switching devices each being connected to a filter which is connected to the supply output, drive means connected to said switching devices for controlling said switching devices, voltage feedback means connected between the output side of said supply and said drive means to supply voltage feedback to said drive means for controlling the output of said switching power supply, and first and second current feedback means wherein said first current feedback means is connected to the output side of said first switching device and to said drive means, said second current feedback means is connected to the output side of said second switching device and to said drive means, said first and second current feedback means providing feedback for biasing said first and second switching devices in the conduction mode during zero current crossover.

* * * * *